United States Patent
Han

(10) Patent No.: US 9,164,757 B2
(45) Date of Patent: Oct. 20, 2015

(54) IMAGE FORMING APPARATUS, TRACKING APPARATUS, MANAGING APPARATUS AND METHOD OF UPDATING FIRMWARE OF IMAGE FORMING APPARATUS

(71) Applicant: Samsung Electronics Co., Ltd, Suwon-si, Gyeonggi-do (KR)

(72) Inventor: Sang-in Han, Yongin-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/031,448

(22) Filed: Sep. 19, 2013

(65) Prior Publication Data
US 2014/0223424 A1 Aug. 7, 2014

(30) Foreign Application Priority Data
Feb. 5, 2013 (KR) ........................ 10-2013-0013038

(51) Int. Cl.
G06F 9/445 (2006.01)
G06F 9/44 (2006.01)

(52) U.S. Cl.
CPC *G06F 8/665* (2013.01); *G06F 8/60* (2013.01); G06F 8/61 (2013.01); G06F 8/65 (2013.01); G06F 8/67 (2013.01); G06F 8/68 (2013.01)

(58) Field of Classification Search
CPC ............... G06F 8/60; G06F 8/61; G06F 8/65; G06F 8/67; G06F 8/68; G06F 8/71
See application file for complete search history.

(56) References Cited

U.S. PATENT DOCUMENTS

| 6,373,582 | B1 * | 4/2002 | Asai .............................. 358/1.13 |
| 7,263,524 | B2 * | 8/2007 | Wiley ........................... 707/770 |
| 8,019,794 | B2 * | 9/2011 | Pathak et al. ................. 707/803 |
| 8,261,256 | B1 * | 9/2012 | Adler et al. ................... 717/173 |
| 2006/0048144 | A1 * | 3/2006 | Willess et al. ................ 717/177 |
| 2007/0055970 | A1 * | 3/2007 | Sakuda et al. ............... 717/168 |
| 2008/0127159 | A1 * | 5/2008 | Regenmorter ............... 717/168 |
| 2008/0189693 | A1 * | 8/2008 | Pathak ......................... 717/168 |
| 2008/0189702 | A1 * | 8/2008 | Morgan et al. ............... 718/100 |
| 2008/0243862 | A1 * | 10/2008 | Pathak et al. .................. 707/10 |
| 2008/0288936 | A1 * | 11/2008 | Ikeda ........................... 717/173 |
| 2009/0063611 | A1 * | 3/2009 | Igarashi ....................... 709/201 |

(Continued)

FOREIGN PATENT DOCUMENTS

KR 2011-0079437 7/2011

OTHER PUBLICATIONS

Mitsuhiro Fukuzawa, "A Generation-Selection Process of Product Architecture: A Case of Development of the Firmware in Digital MFP", the University of Tokyo, vol. 7, Dec. 2008, Global Business Research Center, pp. 1-18; <http://www.gbrc.jp/journal/abas/pdf/ABAS7-1.pdf>.*

(Continued)

*Primary Examiner* — Thuy Dao
*Assistant Examiner* — Ben C Wang
(74) *Attorney, Agent, or Firm* — Staas & Halsey LLP

(57) ABSTRACT

A firmware update method of an image forming apparatus includes determining whether firmware update of the image forming apparatus is necessary, acquiring a firmware block distributor list from the tracking apparatus, receiving firmware blocks from the other image forming apparatuses, based on the acquired firmware block distributor list, and generating new firmware by combining the received firmware blocks and performing firmware update using the generated, new firmware.

24 Claims, 14 Drawing Sheets

(56) References Cited

U.S. PATENT DOCUMENTS

| | | | |
|---|---|---|---|
| 2009/0150878 A1* | 6/2009 | Pathak et al. | 717/172 |
| 2011/0161468 A1* | 6/2011 | Tuckey et al. | 709/220 |
| 2012/0233284 A1* | 9/2012 | Arolovitch et al. | 709/213 |
| 2012/0303715 A1* | 11/2012 | Han et al. | 709/205 |
| 2012/0311010 A1* | 12/2012 | Shah | 709/201 |
| 2013/0198507 A1* | 8/2013 | Kasuya | 713/100 |
| 2013/0227540 A1* | 8/2013 | Ruster et al. | 717/170 |
| 2013/0268924 A1* | 10/2013 | Niwa | 717/168 |
| 2014/0280433 A1* | 9/2014 | Messerli et al. | 709/201 |
| 2014/0282481 A1* | 9/2014 | Ohara | 717/172 |
| 2014/0372997 A1* | 12/2014 | Furushige et al. | 717/168 |

OTHER PUBLICATIONS

Dale et al., "apt-p2p: A Peer-to-Peer Distribution System for Software Package Releases and Updates", 2009 IEEE, Apr. 19, 2009, INFOCOM 2009, pp. 864-872; <http://ieeexplore.ieee.org/stamp/stamp.jsp?tp=&arnumber=5061996>.*

Kim et al., "Energy-Efficient Progressive Remote Update for Flash-Based Firmware of Networked Embedded Systems", Nov. 2010, ACM, pp. 7:1-7:26; <http://dl.acm.org/citation.cfm?id=1870109.1870116&coll=DL&dl=GUIDE&CFID=678840066&CFTOKEN=57943484>.*

* cited by examiner

FIG. 8

APPARATUS LIST (810)

| | STATUS | IP ADDRESS | MODEL NAME | FIRMWARE VERSION |
|---|---|---|---|---|
| ☑ | Normal | 10.10.25.31 | xxxx | 1.0.0 |
| ☑ | Normal | 10.10.25.32 | xxxx | 1.0.0 |
| ☐ | Normal | 10.10.25.33 | xxxx | 1.0.0 |
| ☐ | Warning | 10.10.25.34 | xxxx | 1.0.0 |
| ☐ | Normal | 10.10.25.35 | xxxx | 1.0.0 |
| ☐ | Warning | 10.10.25.36 | xxxx | 1.0.0 |
| ☑ | Normal | 10.10.25.37 | xxxx | 1.0.0 |

FIRMWARE FILE (820)

| FILE NAME | FIRMWARE MODEL | |
|---|---|---|
| onerom.hd | xxxx | ✕ |

[ADD]

FIRMWARE UPDATE SETTING (830)

- DATE OF BEGINNING ● 2012-07-08 01:30  ○ IMMEDIATELY
- FIRMWARE PROVIDER FILTER  10.10.*.*
- CONTINUOUS SEED OPTION  ● MANUAL  ○ AUTO  [OK]
- MAX DURATION OF CONTINUOUS SEED SINCE  2012-07-09 01:30
- MAX UPLOAD SPEED  0  kb/sec  0:NO LIMIT
- MAX DOWNLOAD SPEED  0  kb/sec  0:NO LIMIT

[INITIALIZE] [STORE] [CANCEL]

(800, 811, 812)

IMAGE FORMING APPARATUS, TRACKING APPARATUS, MANAGING APPARATUS AND METHOD OF UPDATING FIRMWARE OF IMAGE FORMING APPARATUS

CROSS-REFERENCE TO RELATED APPLICATIONS

This application claims priority under 35 U.S.C. §119(a) from Korean Patent Application No. 10-2013-0013038, filed on Feb. 5, 2013, in the Korean Intellectual Property Office, the disclosure of which is incorporated herein by reference in its entirety.

BACKGROUND OF THE INVENTION

1. Field of the Invention

The present general inventive concept relates to an image forming apparatus, a tracking apparatus, a managing apparatus and a method of updating firmware of an image forming apparatus, and more particularly, to an image forming apparatus, a tracking apparatus, and a managing apparatus that can update firmware using peer to peer (P2P) method, and a method of updating firmware of an image forming apparatus.

2. Description of the Related Art

An image forming apparatus generally operates to print out print data generated at a terminal, such as a computer, onto a recording medium. The image forming apparatus includes, for example, a copier, a printer, a facsimile, or a multi-function peripheral (MFP) that implements the above functions on one complex device.

The image forming apparatus such as a copier, a printer, or a facsimile utilizes firmware to control hardware. The firmware may be updated to change a function of the image forming apparatus or when error correction is necessary. The firmware update is generally done by a manager of the image forming apparatus who updates image forming apparatuses respectively, or by a managing apparatus (or print control apparatus) that sends firmware to a plurality of image forming apparatuses connected thereto via a network.

However, as functions of the image forming apparatus increase in type and diversity, a size of firmware increased proportionally, according to which it takes an increasing time and cost for the managing apparatus to directly transmit the firmware to the image forming apparatuses via a network.

SUMMARY OF THE INVENTION

The present general inventive concept provides an image forming apparatus, a tracking apparatus, and a managing apparatus that can shorten firmware transmission time by using a BitTorrent-based P2P method, and provide firmware update procedure that takes characteristics of a P2P method into consideration and improve a firmware update management process, and a method of updating firmware of an image forming apparatus.

Additional features and utilities of the present general inventive concept will be set forth in part in the description which follows and, in part, will be obvious from the description, or may be learned by practice of the general inventive concept.

The foregoing and/or other features and utilities of the present general inventive concept are achieved by providing a firmware update method of an image forming apparatus connectable to a tracking apparatus and other image forming apparatuses, the method including determining whether firmware update of the image forming apparatus is necessary, acquiring a firmware block distributor list from the tracking apparatus, receiving firmware blocks from the other image forming apparatuses, based on the acquired firmware block distributor list, and generating new firmware by combining the received firmware blocks and performing firmware update using the generated, new firmware.

The determining may include, when update information is received from a managing apparatus connected to the image forming apparatus, determining that firmware update is necessary.

The update information may include: firmware version information, firmware data information, access information of the tracking apparatus, continuous seed information according to which firmware blocks are continuously transmitted without having firmware update, filter information that restricts network range of the image forming apparatuses to provide firmware blocks, and firmware download start information.

The performing the firmware update may include, when a continuous seeder is selected based on the continuous seed information, performing firmware update after a continuous seeding duration elapses.

The determining may include determining whether firmware update is necessary by comparing the firmware version information with a version of currently-driven firmware.

The performing firmware update may include immediately performing update upon generating of the new firmware or in response to a command to perform firmware update received from a managing apparatus connected to the image forming apparatus.

The receiving the firmware blocks may include receiving the firmware blocks from another image forming apparatus with the least communication traffic on the acquired firmware block distributor list.

The receiving the firmware blocks may include receiving from the other image forming apparatuses and a managing apparatus connected to the image forming apparatus.

The firmware update method may additionally include transmitting at least one of firmware block transmission status and firmware update status to at least one of a managing apparatus connected to the image forming apparatus, and the tracking apparatus.

The foregoing and/or other features and utilities of the present general inventive concept may also be achieved by providing a firmware update method of an image forming apparatus of a tracking apparatus which is connectable to one or more image forming apparatuses and a managing apparatus, is provided, which may include receiving from the one or more connected image forming apparatuses at least one of firmware block transmission status and firmware update status, when a request for firmware block distributor list is received from the image forming apparatus, generating the firmware block distributor list using the firmware block transmission status and the firmware update status, and transmitting the firmware block distributor list to the image forming apparatus.

The firmware update method may additionally include receiving update information from the managing apparatus, the update information comprising at least one of: firmware version information, firmware data information, access information of the tracking apparatus, continuous seed information according to which firmware blocks are continuously transmitted without having firmware update, filter information that restricts network range of the image forming apparatuses to provide firmware blocks, and firmware download start information, and the generating the firmware block distributor list may include, selecting image forming apparatuses within a network range according to the filter information, and generating the firmware block distributor list.

The foregoing and/or other features and utilities of the present general inventive concept may also be achieved by providing a firmware update method of an image forming apparatus of a managing apparatus which is connectable to one or more image forming apparatuses and a tracking apparatus, including receiving update information of the firmware, transmitting the update information to the tracking apparatus and one or more image forming apparatuses in need of firmware update, and when a request for firmware block download is received from the image forming apparatus, transmitting the firmware blocks to the image forming apparatus, wherein the update information may include firmware version information, firmware data information, access information of the tracking apparatus, continuous seed information according to which firmware blocks are continuously transmitted without having firmware update, filter information that restricts network range of the image forming apparatuses to provide firmware blocks, and firmware download start information.

The firmware update method may additionally include receiving at least one of firmware block transmission status and firmware update status from the one or more connected image forming apparatuses, and displaying at least one of the firmware block transmission status and the firmware update status for each image forming apparatus.

The foregoing and/or other features and utilities of the present general inventive concept may also be achieved by providing an image forming apparatus connectable to a tracking apparatus and another image forming apparatus, including a controller to determine whether the image forming apparatus needs firmware update, and a communication interface to acquire a firmware block distributor list from the tracking apparatus, such that the controller may receive firmware blocks from the another image forming apparatus and store the received blocks in the storage, based on the acquired firmware block distributor list, generate new firmware by combining the received firmware blocks, and perform firmware update using the generated, new firmware.

The controller may determine that firmware update is necessary, when receiving update information from a managing apparatus connected to the image forming apparatus.

The update information may include firmware version information, firmware data information, access information of the tracking apparatus, continuous seed information according to which firmware blocks are continuously transmitted without having firmware update, filter information that restricts network range of the image forming apparatuses to provide firmware blocks, and firmware download start information.

The controller may perform firmware update after a continuous seeding duration, when continuous seeder is selected according to the continuous seed information.

The controller may determine whether firmware update is necessary by comparing the firmware version information with a version of a currently-driven firmware.

The controller may immediately perform update upon generating of the new firmware, or perform update in response to a command to perform firmware update received from a managing apparatus connected to the image forming apparatus.

The controller may receive firmware blocks from an image forming apparatus with the least communication traffic on the acquired block distributor list.

The controller may receive the firmware blocks from the another image forming apparatus and a managing apparatus connected to the image forming apparatus.

The controller may transmit at least one of firmware block transmission status and firmware update status to at least one of a managing apparatus connected to the image forming apparatus and the tracking apparatus.

The foregoing and/or other features and utilities of the present general inventive concept may also be achieved by providing a tracking apparatus connectable to one or more image forming apparatuses and a managing apparatus, including a communication interface to receive at least one of firmware block transmission status and firmware update status from the one or more connected image forming apparatuses, and a controller to generate a firmware block distributor list using the firmware block transmission status and the firmware update status, when receiving a request to generate the firmware block distributor list from the image forming apparatus. The controller may control the communication interface to transmit the firmware block distributor list to the image forming apparatus.

The communication interface may receive update information comprising at least one of: firmware version information, firmware data information, access information of the tracking apparatus, continuous seed information according to which firmware blocks are continuously transmitted without having firmware update, filter information that restricts network range of the image forming apparatuses to provide firmware blocks, and firmware download start information, and the controller may select image forming apparatuses within a network range according to the filter information, to generate the firmware block distributor list.

The foregoing and/or other features and utilities of the present general inventive concept may also be achieved by providing a managing apparatus connectable to one or more image forming apparatuses and a tracking apparatus, including a user interface to receive firmware to be updated and update information of the firmware, a communication interface to transmit the update information to the tracking apparatus and the one or more image forming apparatuses in need of firmware update, and a controller to control the communication interface to transmit firmware blocks to the image forming apparatus, when a request to perform a firmware block download is received from the image forming apparatus. The update information may include firmware version information, firmware data information, access information of the tracking apparatus, continuous seed information according to which firmware blocks are continuously transmitted without having firmware update, filter information that restricts network range of the image forming apparatuses to provide firmware blocks, and firmware download start information.

The controller may control the user interface to receive at least one of firmware block transmission status and firmware update status from the one or more connected image forming apparatuses and display the same with respect to each image forming apparatus.

The foregoing and/or other features and utilities of the present general inventive concept may also be achieved by providing a tracking apparatus, including a communication interface to connect the tracking apparatus to a managing apparatus and at least one image forming apparatus and to receive firmware update information from the managing apparatus based on a determination that a firmware update is necessary in the at least one image forming apparatus, and a controller to generate a firmware block distributor list including any of the at least one image forming apparatuses having a same corresponding non-updated firmware block and to control the communication interface to transmit the firmware block distributor list to the at least one image forming apparatus to perform the firmware update.

The determination that the firmware update is necessary in the at least one image forming apparatus may be based on a receipt of at least one of a firmware block transmission status and a firmware updated status from the at least one image forming apparatus.

The tracking apparatus may further include a storage to store the at least one of a firmware block transmission status and a firmware updated status, the update information received from the managing apparatus, and the firmware block distributor list generated by the controller.

The firmware update information may include at least one of firmware version information, firmware data information, access information of the tracking apparatus, continuous seed information according to which firmware blocks are continuously transmitted without having firmware update, filter information that restricts network range of the image forming apparatuses to provide firmware blocks, and firmware download start information.

The firmware update information may be sent from the managing apparatus to the tracking apparatus via a peer-to-peer method in a format of a Torrent file under a BitTorrent protocol.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIG. 8 is a view provided to illustrate a user interface (UI) of a managing apparatus that receives firmware update information of an image forming apparatus, according to an exemplary embodiment of the present general inventive concept;

DETAILED DESCRIPTION OF THE PREFERRED EMBODIMENTS

Figure 1:
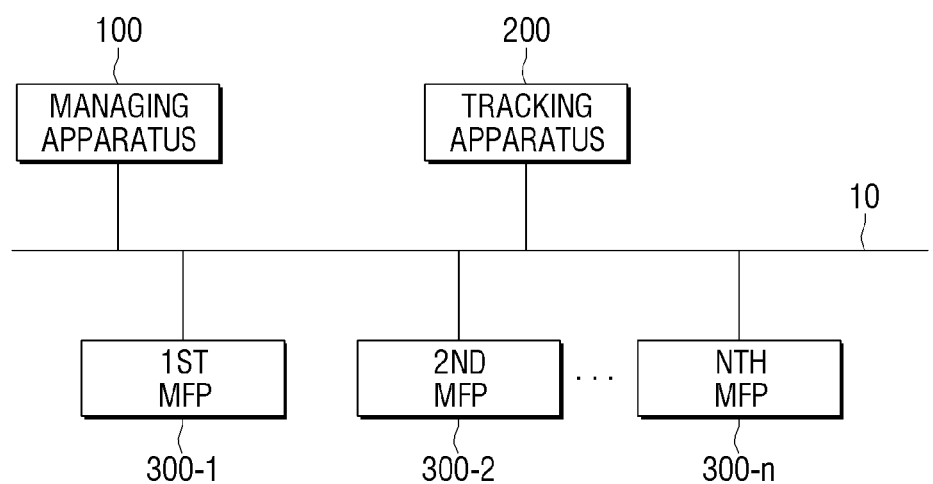
FIG. 1 is a block diagram of an image forming system according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

FIG. 1 is a block diagram of an image forming system according to an exemplary embodiment of the present general inventive concept.

Referring to FIG. 1, the image forming system according to an exemplary embodiment of the present general inventive concept may include a managing apparatus 100, a tracking apparatus 200, and one or more image forming apparatuses 300-1, 300-2, . . . , 300-n.

The image forming system may be connected via a network 10, and the network 10 may be formed by a local area network (LAN) and the Internet.

The managing apparatus 100 operates to control respective components of the image forming system, and may transmit a job command to the one or more image forming apparatuses 300-1, 300-2, . . . , 300-n (hereinafter, "300") connected thereto via the network 10.

The managing apparatus 100 may also provide a firmware file and an update setting to update the firmware of the image forming apparatuses 300, and control the overall update process. The managing apparatus 100 will be explained in detail below with reference to FIG. 2.

The "firmware" as used herein refers to a micro program. Meanwhile, when the image forming apparatuses 300 are implemented as a plurality of processors, new firmware may include a new micro program corresponding to one processor, or a group of micro programs corresponding to each of the plurality of processors.

The tracking apparatus 200 is configured to monitor a seeder and a peer to transmit data by BitTorrent protocol-based P2P manner. The tracking apparatus 200 may play a role of a tracker according to BitTorrent protocol.

The "BitTorrent protocol-based P2P manner" as used herein refers to a data communication method among users via a medium of Torrent files.

The Torrent file contains metadata of the file to perform sharing, or URL of the tracker, and when the Torrent file is executed, information about a seeder of the current shared file may be received from the tracker.

The "seeder," as used herein, refers to a user who has an entire or a partial file to share, and distributes the same.

Therefore, the firmware distribution time of the image forming apparatus 300 can be shortened by utilizing the BitTorrent protocol-based P2P manner.

Details of the image forming apparatus 300, the tracking apparatus 200 and the managing apparatus 100 will be explained in greater detail below with reference to exemplary embodiments of the present general inventive concept.

Figure 2:
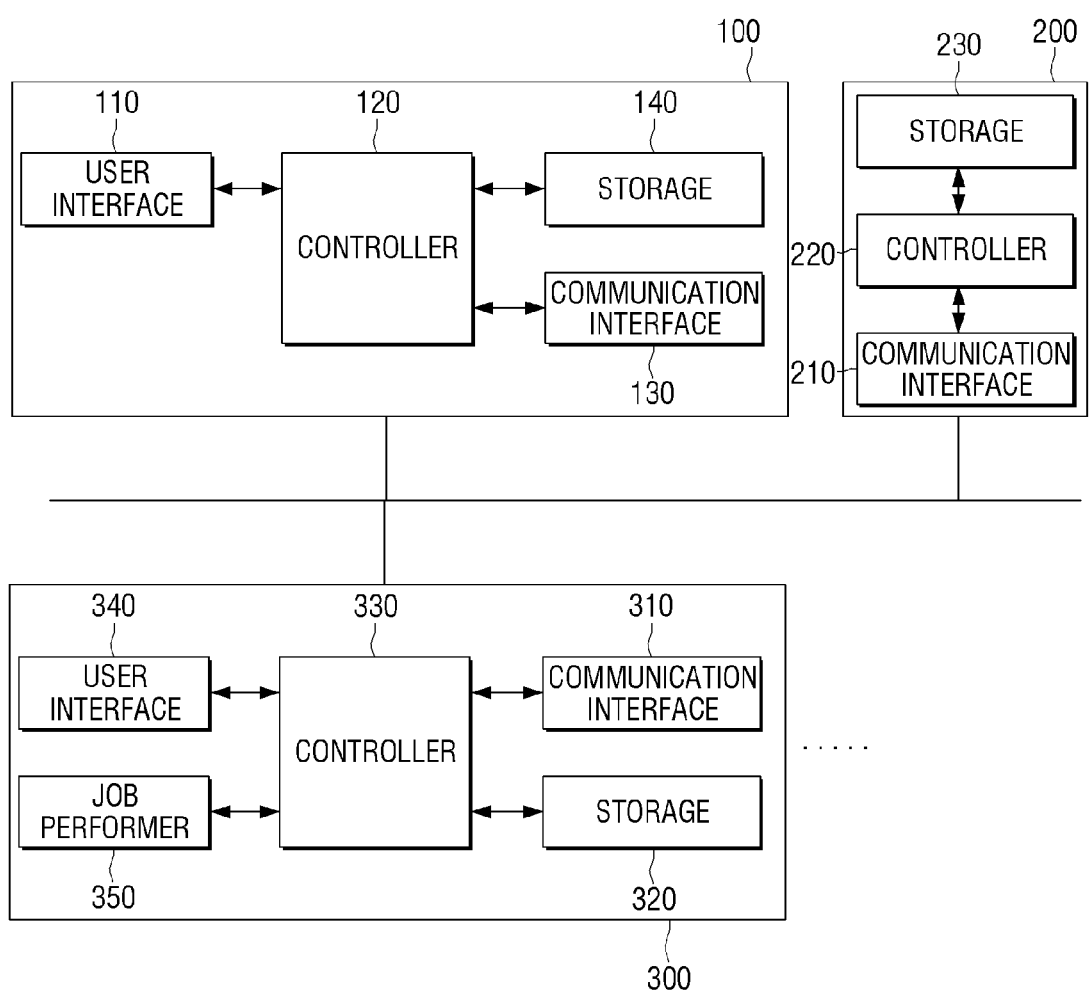
FIG. 2 is a block diagram of a managing apparatus, a tracking apparatus and an image forming apparatus according to an exemplary embodiment of the present general inventive concept.

FIG. 2 is a block diagram of the managing apparatus 100, the tracking apparatus 200 and the image forming apparatus 300 according to an exemplary embodiment of the present general inventive concept.

Referring to FIG. 2, the image forming apparatus 300 includes a communication interface 310, a storage 320, a controller 330, a user interface 340 and a job performer 350.

The communication interface 310 is configured to connect the image forming apparatus 300 to the managing apparatus 100, the tracking apparatus 200 and the other image forming apparatuses, by connecting in a wired or wireless manner via the LAN and the Internet.

The communication interface 310 may receive firmware update information from the managing apparatus 100.

The "firmware update information," as used herein, refers to at least one of firmware version, firmware data, access information of tracking apparatus, continuous seed information, filter information, and firmware download start information, but is not limited thereto. The update information will be explained in detail below.

The "firmware version" represents the order of developing firmware by numbers, and this may be used to determine a need to perform a firmware update.

The "firmware data" refers to information about a size of a firmware block and a filename of the firmware. The "firmware block" as used herein refers to a portion of the firmware that is separated from the firmware into a preset size.

The "access information to tracking apparatus" as used herein refers to uniform resource locator (URL) or IP address with which to access the tracking apparatus.

The "continuous seed information," as used herein, refers to information about continuous seeder that continuously transmits the firmware block without performing firmware update, and this may include continuous seeder select information and continuous seeding duration.

The "filter information," as used herein, refers to information to restrict network range of the image forming apparatus that provides the firmware block.

The "firmware download start information," as used herein, refers to information regarding a time to start a transmission and to update firmware, and this may be used on idle time of the network.

The update information may be used in the firmware updating process that takes characteristics of P2P method into consideration, through which it is possible to improve a method of managing firmware update of the image forming apparatus.

Meanwhile, the communication interface 310 may acquire a list of firmware block distribution from the tracking apparatus 200. Under control of the controller 330, the communication interface 310 may request the tracking apparatus 200 corresponding to a list of firmware block distribution to be downloaded, and receive the same from the tracking apparatus 200.

Further, the communication interface unit 310 may receive the firmware block from the other image forming apparatus and the managing apparatus 100 connected to the image forming apparatus, under control of the controller 330.

In contrast, when receiving a request to transmit a firmware block from another image forming apparatus, under control of the controller 330, the communication interface 310 may transmit the corresponding firmware block to the another image forming apparatus.

As explained above, the image forming apparatus 300 may not only receive the firmware block, but also transmit the received firmware block upon receiving the same.

The communication interface 310 may also transmit one of firmware block transmission status and firmware update status to at least one of the managing apparatus 100 and the tracking apparatus 200, under control of the controller 330.

The storage 320 may store the received firmware block and when all the firmware blocks are received so that new firmware is generated, and may store the new firmware, under control of the controller 330.

The storage 320 may be implemented as an internal storage medium or external storage medium of the image forming apparatus 300, such as, for example, a removable disk including USB memory, or a networked web server. Although an exemplary embodiment of the present general inventive concept is explained herein by illustrating and explaining only one type of storage 320, such that the storage 320 may be implemented as a memory to perform data storage and a memory to perform command processing, respectively.

Meanwhile, the storage 320 may temporarily store not only the respective firmware blocks, but also update information received from the managing apparatus 100, or firmware block distributor list acquired from the tracking apparatus 200. Further, the storage 320 may temporarily store a job command or print data as input from the managing apparatus 100 or the user interface 340.

The controller 330 determines whether a firmware update of the image forming apparatus is necessary. To be specific, when receiving update information from the managing apparatus 100, the controller 330 may determine that the firmware update is necessary. Additionally, the controller 330 may determine that the firmware update is necessary, based on comparison between firmware version with the currently-driven firmware version.

When the currently-driven firmware version is more recent or same, the controller 330 may determine that firmware update is unnecessary, while, on the contrary, the controller 330 may determine that firmware update is necessary when the currently-driven firmware version is older.

Meanwhile, the controller 330 may determine that the firmware update is necessary, when determining that download start time has elapsed based on the firmware download start information.

Meanwhile, based on the acquired firmware block distributor list, the controller 330 may receive firmware blocks from another image forming apparatus or managing apparatus 100. The controller 330 may store the received firmware blocks to the storage 320.

When all the firmware blocks are received, the controller 330 may combine the received firmware blocks to generate new firmware and perform the firmware update by executing the generated new firmware.

To be specific, when new firmware is generated, the controller 330 may re-boot the image forming apparatus 300. As a result of the re-booting, the newly-generated firmware is loaded to a volatile memory such as a dynamic random access memory (DRAM of a central processing unit (CPU), and the image forming apparatus 300 operates based on the new firmware.

Meanwhile, when the image forming apparatus 300 is selected as a continuous seeder according to the continuous seed information, the firmware update may be performed after the continuous seeding duration.

However, even the image forming apparatus 300 selected to be a continuous seeder may also perform the firmware update even within the continuous seeding duration, when it receives a command to update the firmware from the managing apparatus 100.

When the image forming apparatus 300 is in the process of the firmware update, the overall operation of the image forming apparatus 300 may be less stable and a re-boot is likely. Accordingly, firmware block distribution may be unstable. Accordingly, even when all the firmware blocks are received, the firmware update does not begin directly. That is, a continuous seeder to take care of firmware block transmission is selected to ensure stable firmware block distribution.

Meanwhile, the controller 330 may perform the firmware update directly upon generation of new firmware when the image forming apparatus 300 is not selected to be the continuous seeder. The update may be performed along with a download.

Meanwhile, the controller 330 may receive firmware block from another image forming apparatus with the least communication traffic from the block distributor list.

Meanwhile, the controller 330 may be implemented as components such as a CPU, a read only memory (ROM) or a RAM, in order to control the respective components of the image forming apparatus 300 that are connected to one another via an internal bus.

The user interface 340 may include a plurality of function keys with which a user can set or select various functions supported by the image forming apparatus 300, and may display various information as provided from the image forming apparatus 300. The user interface 340 may implement both an input and an output, such as a touchpad.

The user interface 340 may display information related to firmware install (or firmware update). To be specific, the user interface 340 may display, on the user interface window, information related to the firmware install such as, for example, time consumed during installation of new firmware (or upgrading), or details of installing procedure of new firmware.

The job performer 350 may perform a job corresponding to an inputted job command. To be specific, the job performer 350 may include component such as a print engine unit, a scanning unit, or a fax unit, to thus perform a job in response to the job command issued by the user.

Since the print engine unit, the scanning unit and the fax unit are well known to one of ordinary skill in the art, these will not be explained redundantly.

According to an exemplary embodiment of the present general inventive concept, the image forming apparatus 300 may download firmware, and also transmit the firmware blocks to another image forming apparatus using a BitTorrent-based P2P method. Accordingly, time to transmit the firmware can be shortened.

Hereinafter, the tracking apparatus 200 and the managing apparatus 100 connected respectively to the image forming apparatus 300 will be explained.

The tracking apparatus 200 may include a communication interface 210, a controller 220 and a storage 230.

The communication interface 210 is configured to connect the tracking apparatus 200 to the managing apparatus 100 and the image forming apparatus 300, by a communication in a wired or wireless manner using LAN and the internet.

The communication interface 210 may receive at least one of the firmware block transmission status and firmware updated status from the connected at least one image forming apparatus 300.

The communication interface 210 may transmit a generated firmware block distributor list to the image forming apparatus, under control of the controller 220.

Meanwhile, the communication interface 210 may receive from the managing apparatus 100 the update information. As explained above, the update information may include at least one of firmware version, firmware data, continuous seed information about a continuous seeder that continuously transmits firmware block without performing firmware update, filter information to restrict network range of the image forming apparatus to provide firmware block, and firmware download start information.

When a request to receive a firmware block distributor list is received from the image forming apparatus 300, the controller 220 may generate the firmware block distributor list using the firmware block transmission status and the firmware update status.

In one example, in response to a request to receive a first firmware block distributor list, the controller 220 may search to find an image forming apparatus having a first firmware block based on the firmware block transmission status received from the respective image forming apparatuses, and select any image forming apparatus that has not updated firmware and generates a list.

That is, the controller 220 may select the image forming apparatuses that have the corresponding firmware block and that have not performed firmware update, and include these into the firmware block distributor list.

The controller 220 may also control the communication interface 210 to transmit the firmware block distributor list to the image forming apparatus 300.

Meanwhile, in generating the firmware block distributor list, the controller 220 may select the image forming apparatuses within the network range that are allowed based on the filter information included in the update information. This will be explained in detail below with reference to FIG. 7.

Meanwhile, the controller 220 may be implemented as the components such as a CPU, a ROM, or a RAM to control the respective parts of the tracking apparatus 200 are connected to one another via internal bus.

The storage 230 may not only store the firmware block transmission status and the firmware update status received from the respectively connected image forming apparatuses, but also temporarily store the update information received from the managing apparatus 100 and the firmware block distributor lists respectively generated by the controller 220.

Meanwhile, the storage 230 may be implemented as an internal storage medium or external storage medium of the tracking apparatus 200, such as, for example, a removable disk including USB memory, or a networked web server. Although an exemplary embodiment of the present general inventive concept is explained herein by illustrating and explaining only one type of storage 230, such that the storage 230 may be implemented as a memory to perform data storage and a memory to perform command processing, respectively.

In one exemplary embodiment of the present general inventive concept, the tracking apparatus 200 provides the image forming apparatus 300 with the list of specific firmware blocks to be transmitted, thereby enabling P2P firmware transmission, and also generates firmware block list using the filter information, thereby providing stable reception of firmware from the near image forming apparatus of the network.

The managing apparatus 100 may include a user interface 110, a controller 120, a communication interface 130 and a storage 140.

The user interface 110 may include a plurality of function keys with which a user can set or select various functions supported by the managing apparatus 100, and may display various information as provided from the managing apparatus 100. The user interface 110 may implement both input and output such as a touchpad, or combined with an input device such as a mouse or a keyboard, and a display device such as a CRT monitor, an LCD monitor, or an LED monitor.

The user interface 110 may display a user interface window to receive firmware to be updated and update information of the firmware. The user interface window displayable by the user interface 110 will be explained below with reference to FIG. 8.

The user interface 110 may additionally display information related to the firmware update, which is under the control of the controller 120. To be specific, the user interface 110 may display the firmware block transmission status and the firmware update status of each image forming apparatus on the user interface window.

Meanwhile, the user interface 110 may receive a job command directing a connected image forming apparatus to perform a job, and display the overall status of the image forming apparatus to perform a monitoring operation.

The controller 120 may control the communication interface 130 to transmit the update information to the tracking apparatus 200 and at least one image forming apparatus 300 in need of firmware update. To be specific, the firmware update information inputted from the user interface 110 may be transmitted to the tracking apparatus 200 and the image forming apparatus 300 selected to be a subject of firmware update.

The controller 120 may divide the firmware to be updated into a preset number of blocks. This is to transmit the data in a BitTorrent-based P2P method, according to which one firmware file can be divided based on a preset block unit to generate a plurality of firmware blocks.

Further, the controller 120 may generate a Torrent file (i.e., torrent extension) based on the update information input from the user interface 110.

In one exemplary embodiment of the present general inventive concept, the firmware update information may be implemented as a Torrent file under BitTorrent protocol.

Meanwhile, the controller 120 may control the user interface 110 to receive at least one of the firmware block transmission status and firmware updated status from the connected image forming apparatus 300 and display the received information corresponding to each image forming apparatus.

Meanwhile, the controller 120 may be implemented as the components such as a CPU, a ROM, or a RAM to control the respective components of the managing apparatus 100 are connected to one another via an internal bus.

The communication interface 130 may transmit the firmware update information received from the user interface 110 to the image forming apparatus 300 or the tracking apparatus 200.

Further, the communication interface 130 may transmit firmware blocks to the image forming apparatus 300, when a request to perform a download of firmware blocks is received from the image forming apparatus 300.

The communication interface 130 may receive the firmware block transmission status and the firmware update status from the respective image forming apparatuses connected thereto.

Meanwhile, the communication interface 130 may be configured to connect the managing apparatus 100 to the tracking apparatus 200 and the image forming apparatus 300, by communication in a wired or wireless manner via the LAN and the internet.

The storage 140 may store the firmware file in the form of a plurality of divided firmware blocks and update information. Further, the storage 140 may store the firmware block transmission status and the firmware update status received from the respective image forming apparatuses connected thereto.

The storage 140 may be implemented as an internal storage medium or an external storage medium of the managing apparatus 100, such as, for example, a removable disk including USB memory, or a networked web server. Although an exemplary embodiment of the present general inventive concept is explained herein by illustrating and explaining only one type of storage 140, such that the storage 140 may be implemented as a memory to perform data storage and a memory to perform command processing, respectively.

As explained above, in one exemplary embodiment of the present general inventive concept, the managing apparatus 100 can monitor firmware update status of the respective image forming apparatuses, and depending on need, may issue a firmware update command to the image forming apparatus finished with transmission so that an update is performed.

Figure 3:
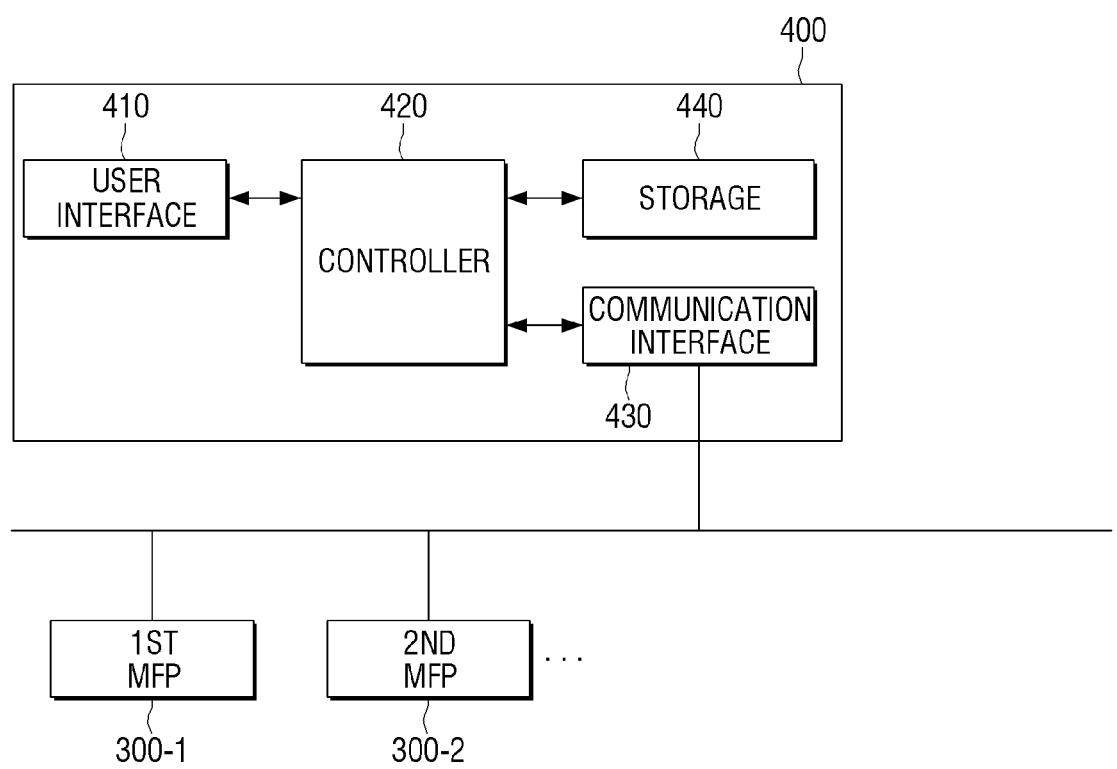
FIG. 3 is a block diagram of a managing apparatus according to various exemplary embodiments of the present general inventive concept.

FIG. 3 is a block diagram of a managing apparatus 400 according to various exemplary embodiments of the present general inventive concept.

Referring to FIG. 2, the managing apparatus 100 and the tracking apparatus 200 are separate devices from each other. However, depending on exemplary embodiments of the present general inventive concept, the function of the tracking apparatus 200 may be incorporated into the managing apparatus 400 as illustrated in FIG. 3.

Referring to FIG. 3, the managing apparatus 400 additionally having the tracking function may include a user interface 410, a controller 420, a communication interface 430 and a storage 440.

Since the user interface 410, the controller 420, the communication interface 430 and the storage 440 of the managing apparatus 400 additionally having the tracking function may have all the functions of the elements of the managing apparatus 100 explained above with reference to FIG. 2, overlapping functions will not be redundantly explained.

In addition to the function of the controller 120 of the managing apparatus 100 (FIG. 2), the controller 420 may also generate a firmware block distributor list using firmware block transmission status and firmware update status and control the communication interface 430 to transmit the firmware block distributor list, when a request to transmit a firmware block distributor list is received from the image forming apparatus 300.

Meanwhile, the controller 420 may select image forming apparatus within a network range as allowed based on the filter information included in the update information, when generating the firmware block distributor list.

In addition to the function of the communication interface 130 of the managing apparatus 100 of FIG. 2, the communication interface 430 may additionally transmit the generated firmware block distributor list to the image forming apparatus 300, under control of the controller 420.

The storage 440 may temporarily store the respective firmware block distributor lists generated at the controller 220.

Accordingly, the managing apparatus 400 as illustrated in FIG. 3 may perform not only the function of the managing apparatus 100 or FIG. 2, but also the function of the tracking apparatus 200 of FIG. 2.

Figure 4:
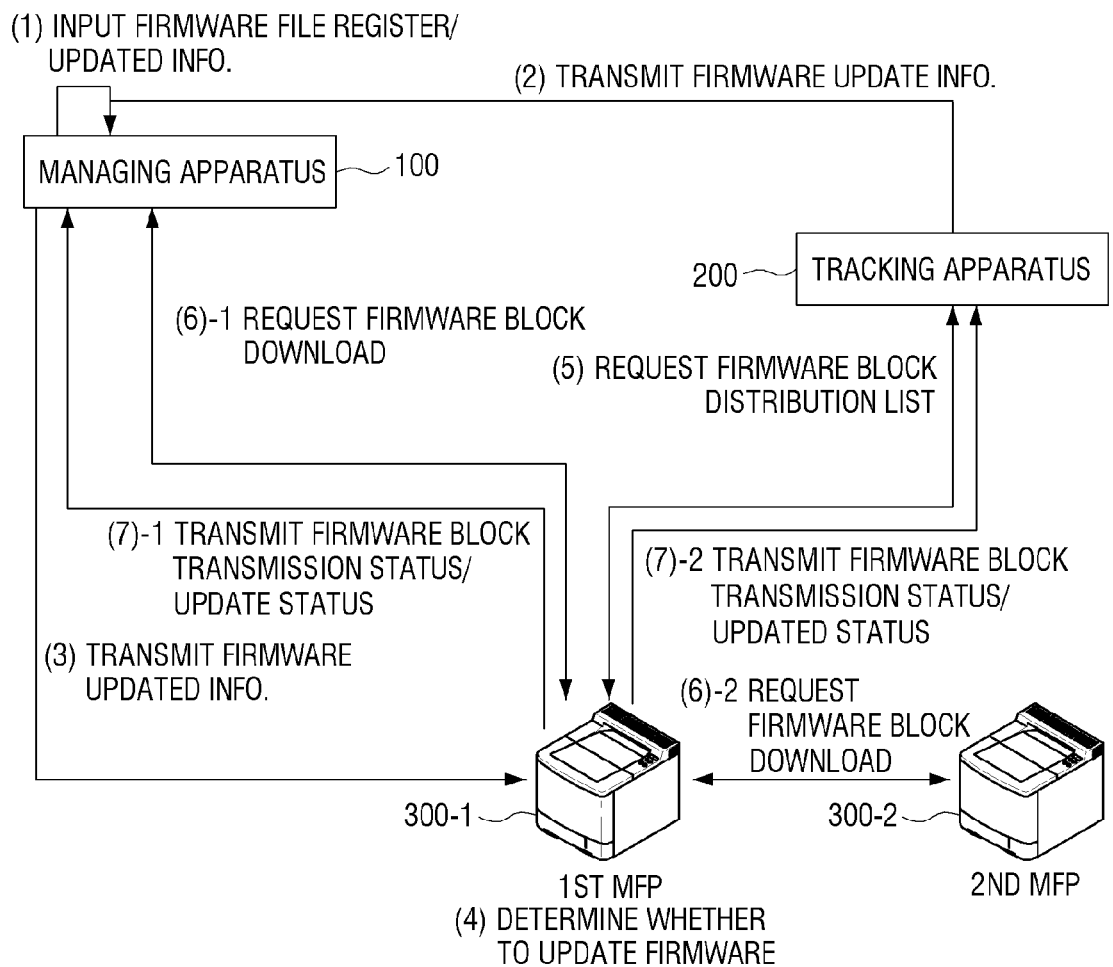
FIG. 4 is a view provided to illustrate a method of updating firmware of an image forming apparatus according to an e exemplary embodiment of the present general inventive concept.

FIG. 4 is a view provided to illustrate a firmware update method of an image forming apparatus 300 according to an exemplary embodiment of the present general inventive concept.

Referring to FIG. 4, firmware file may be registered at the managing apparatus 100 and the update information may be input (1).

The managing apparatus 100 may then transmit the update information to the tracking apparatus 200 (2), and transmit the update information to multi-function peripherals (hereinafter, 'image forming apparatuses') 300-1 and 300-2 to perform a firmware update (3).

The image forming apparatus 300-1, after receipt of the update information, may determine whether the firmware update is necessary (4). The criteria to determine the need to perform the update may be based on the firmware version, as explained above with reference to FIG. 2. When the determination indicates that the firmware update is necessary, the image forming apparatus 300-1 may request from the tracking apparatus 200 a firmware block distributor list to transmit intended firmware blocks and acquire the same (5).

Subsequently, the image forming apparatus 300-1 may request a firmware block download to another image forming apparatus 300-2 with the least traffic or to the managing apparatus 100 based on the firmware block distributor list, and receive the firmware blocks (6).

The image forming apparatus 300-1 may then transmit a firmware block transmission status and an update status to the managing apparatus 100 and the tracking apparatus 200 (7).

The image forming apparatus 300-1 may repeat steps (5) through (7) until all the blocks of the firmware file are downloaded, and may generate new firmware and perform an update when all the firmware blocks are received.

Figure 5:
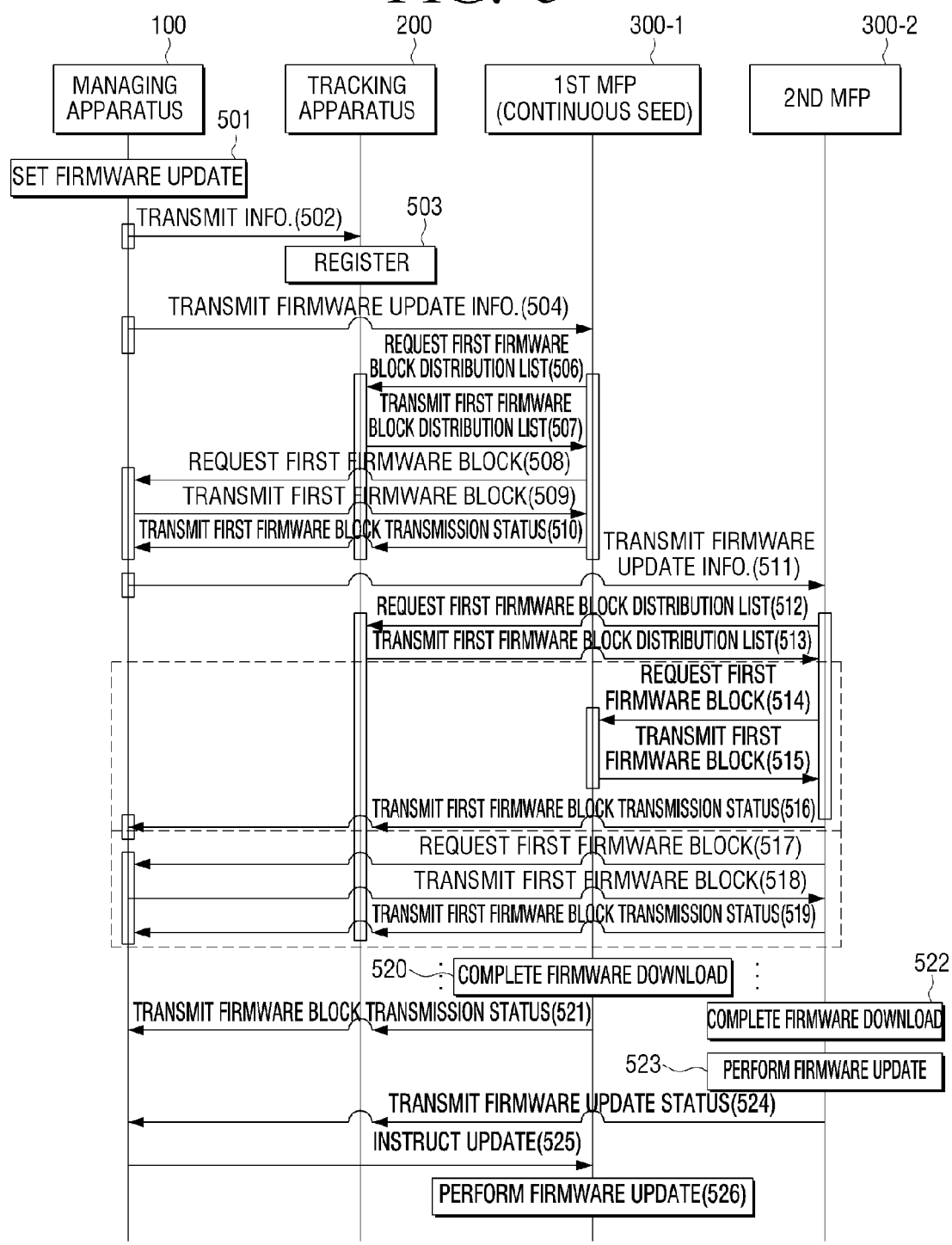
FIG. 5 is a timing view provided to illustrate a firmware update operation of an image forming apparatus according to an exemplary embodiment of the present general inventive concept.

FIG. 5 is a timing view provided to illustrate firmware update operation of the image forming apparatus according to an exemplary embodiment of the present general inventive concept.

Referring to FIG. 5, at S501, when firmware update setting is input at the managing apparatus 100, at S502, the managing apparatus 100 may transmit update information to the tracking apparatus 200. The update information may be Torrent file under BitTorrent protocol.

At S503, the tracking apparatus 200 may register the received update information.

At S504, the managing apparatus 100 may transmit the firmware update information to the first MFP (hereinafter, 'image forming apparatus') 300-1.

It is assumed that the first image forming apparatus 300-1 is set as a continuous seeder.

At S506, the first image forming apparatus 300-1 may request to transmit the first firmware block distributor list to the tracking apparatus 200, to download the first firmware block, and at S507, the tracking apparatus 200 may transmit the first firmware block distributor list to the first image forming apparatus 300-1.

The first firmware block distributor list may include the managing apparatus 100 only.

Accordingly, at S508, the first image forming apparatus 300-1 may request the managing apparatus 100 to transmit the first firmware blocks, and at S509, the managing apparatus 100 may transmit the first firmware block to the first image forming apparatus 300-1 in response.

At S510, the first image forming apparatus 300-1 may transmit the first firmware block transmission status to the managing apparatus 100 and the tracking apparatus 200. This is done in order to have the managing apparatus 100 monitor the download status of the firmware block.

Meanwhile, the tracking apparatus 200 may receive the first firmware block transmission status and add the first image forming apparatus 300-1 to the list of apparatuses that have the first firmware blocks.

At S511, the managing apparatus 100 transmits update information to the second image forming apparatus 300-2. Although the managing apparatus 100 transmits update information to the first image forming apparatus 300-1 before transmitting the same to the second image forming apparatus 300-2, other exemplary embodiments of the present general inventive concept are possible. For Example, the update information may be transmitted simultaneously to all the networked image forming apparatuses, or in a changed (i.e., different) order.

After that, at S512, the second image forming apparatus 300-2 may request first firmware block distributor list to the tracking apparatus 200 in the same manner as in operations S506 and S507, and at S513, the tracking apparatus 200 may transmit the same to the second image forming apparatus 300-2.

The first firmware block distributor list may include not only the managing apparatus 100, but also the first image forming apparatus 300-1.

Accordingly, the second image forming apparatus 300-2 may request to transmit the first firmware block to the managing apparatus 100 or the first image forming apparatus 300-1.

Meanwhile, the second image forming apparatus 300-1 may select one from among the managing apparatus 100 and the first image forming apparatus 300-1 to request transmission of the first firmware block. The criteria of the selection may include network traffic or continuous seed status.

The following operations S514 through 516 relate to requesting the first image forming apparatus 300-1 for the first firmware blocks and receiving the same, and the operations S517 through S519 relate to requesting the managing server 100 to receive the first firmware blocks and receiving the same.

Since the operations S514 through S516 and S517 through S519 may be performed in the same manner as the operations S508 through S509, the overlapping operation will not be redundantly explained.

In the manner explained above, the second firmware block to nth firmware block (based on assumption that the firmware is divided into (n) number of blocks) may be distributed to the respective image forming apparatuses that perform the updating of the firmware.

At S520, when all the firmware blocks are downloaded to the first image forming apparatus 300-1, instead of directly performing firmware update, at S521, the download processing status may only be transmitted to the managing apparatus 100 and the tracking apparatus 200.

That is, the first image forming apparatus 300-1, which is selected to be a continuous seeder, does not perform an update, so as to distribute the firmware blocks.

In contrast, at S522, when the second image forming apparatus 300-2, which is not selected to be the continuous seeder, completely downloads all the firmware blocks, at S523, the second image forming apparatus 300-2 may generate new firmware and perform firmware update.

After the firmware update, the second image forming apparatus 300-2 may transmit the update status to the managing apparatus 100 and the tracking apparatus 200.

Meanwhile, at S525, when the first image forming apparatus 300-1 as the continuous seeder receives a separate update command, at S526, the first image forming apparatus 300-1 may perform a firmware update.

As explained above, the image forming apparatus selected to be the continuous seeder may serve a function of distributing firmware blocks to the other image forming apparatuses without directly performing update, even when all the firmware blocks are received.

Figure 6:
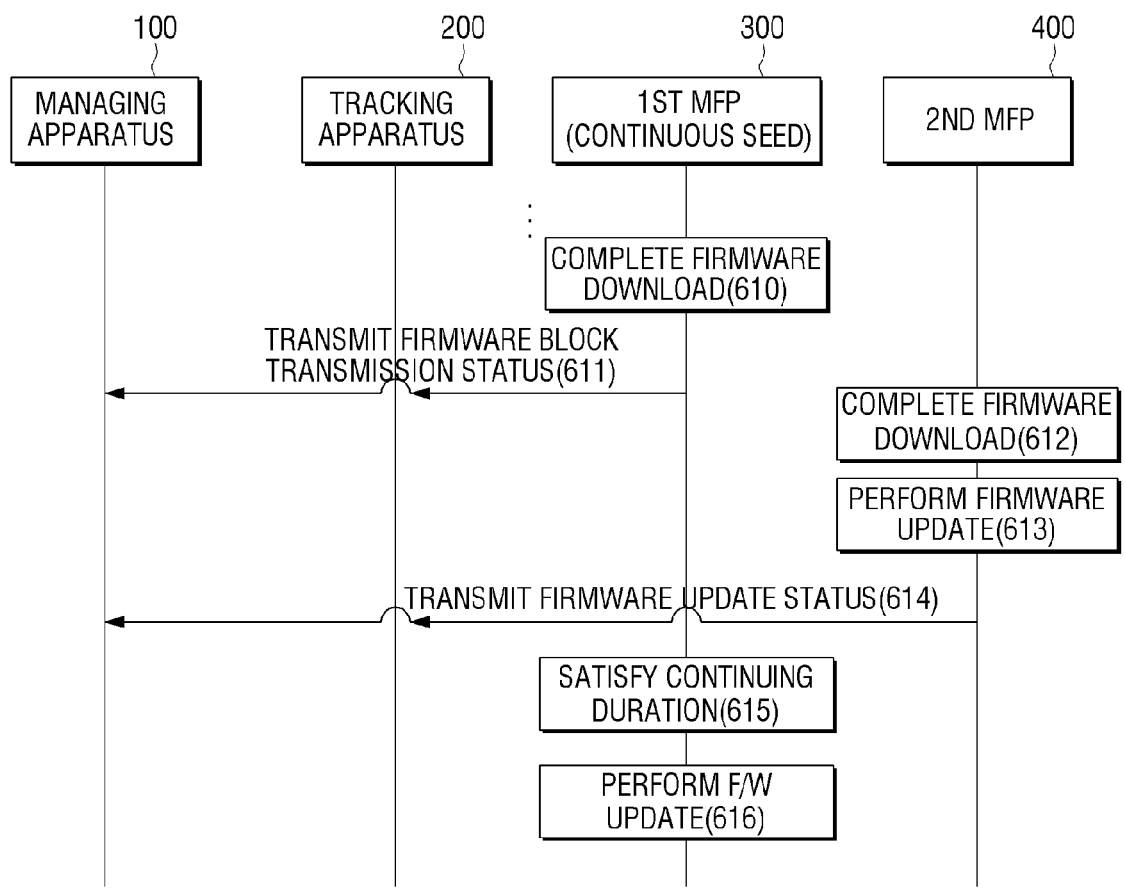
FIG. 6 is a timing view provided to illustrate a firmware update operation of an image forming apparatus according to various exemplary embodiments of the present general inventive concept.

FIG. 6 is a timing view provided to illustrate a firmware update operation of an image forming apparatus according to various exemplary embodiments of the present general inventive concept.

Referring to FIG. 6, the firmware update operation after the firmware block distribution according to various exemplary embodiments of the present general inventive concept will be explained below. Since the operations S520 through S524 of FIG. 6 and the operations S610 through S614 of FIG. 6 may be performed likewise, the redundant explanation will be omitted.

Referring to FIG. 6 and as explained above with reference to FIG. 5, at S610, when the first image forming apparatus 300 as a continuous seeder completely downloads all the firmware blocks, at S611, the first image forming apparatus 300 may transmit the download completion status to the managing apparatus 100 and the tracking apparatus 200, without directly performing a firmware update.

Subsequently, at S615, when the continuous seeding duration contained in the continuous seed information elapses, at S616, the image forming apparatus 300 as the continuous seeder may stop sending firmware blocks, but starts to perform the firmware updating.

As explained above, the image forming apparatus may automatically perform the update of the firmware without requiring a separate instruction, when a continuous seeding duration as input by the user elapses.

Figure 7:
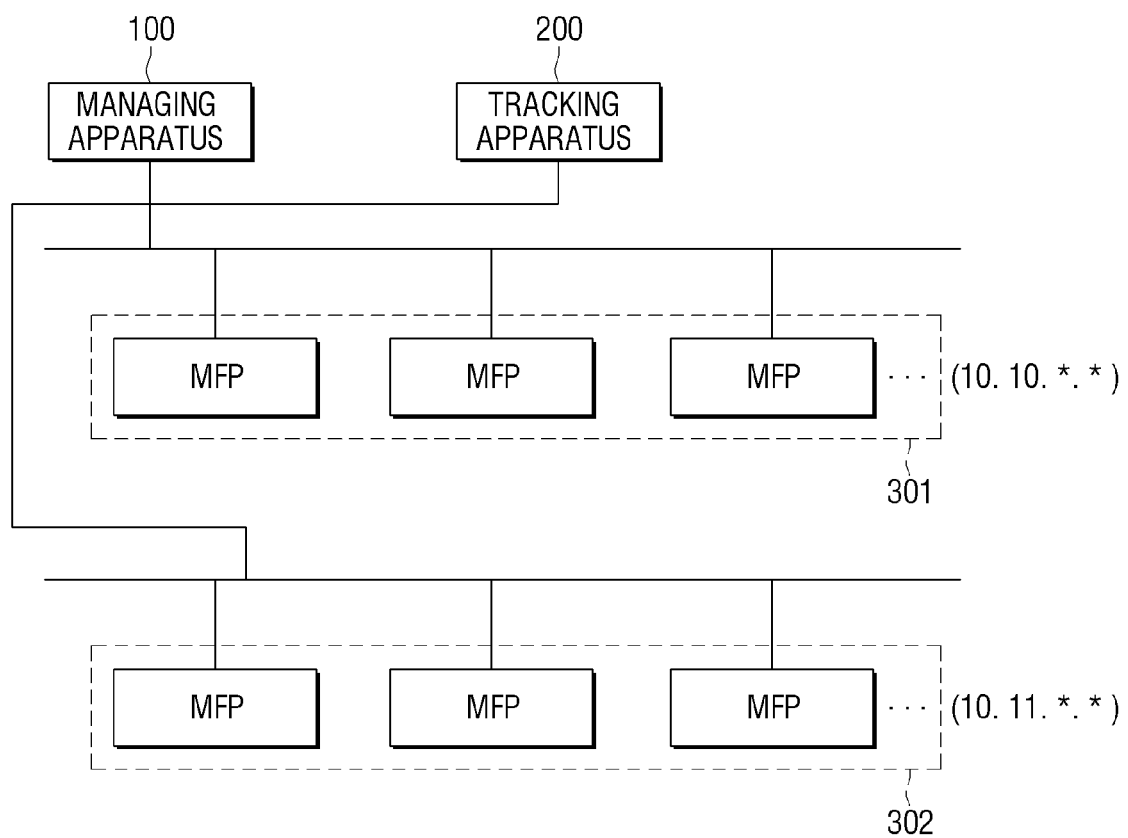
FIG. 7 is a view provided to illustrate a firmware update operation of an image forming apparatus by using filtering information, according to an exemplary embodiment of the present general inventive concept.

FIG. 7 is a view provided to illustrate a firmware update operation of an image forming apparatus using filter information, according to an exemplary embodiment of the present general inventive concept.

Referring to FIG. 7, two networks 301 and 302 are commonly connected to one managing apparatus 100 and one tracking apparatus 200.

When the image forming apparatus of the first network 301 at address (**10.10.\*.\*) transmits data to the image forming apparatus of the second network 302 at address (10.11.\*.\***), data transmission is less stable than when the data is transmitted among image forming apparatuses of the same network. As a result, there is high possibility of transmission delay.

Accordingly, the user may set a network range of the image forming apparatuses to perform distributing of firmware blocks, so that the firmware blocks are received from the image forming apparatuses within a preset range.

The network range may be included in the filter information of the update information.

FIG. 8 is a view provided to illustrate a user interface (UI) of the managing apparatus that receives firmware update information of the image forming apparatus, according to an exemplary embodiment of the present general inventive concept.

To be specific, referring to FIG. 8, an exemplary embodiment of the present general inventive concept of the user interface window 800 to receive firmware update information may be displayed on the UI 110 of the managing apparatus 100.

Referring to FIG. 8, the user interface window 800 may include a device list 810, a firmware file set menu 820, and a firmware update set menu 830.

The device list 810 may display a list of image forming apparatuses connected to the managing apparatus 100. To be specific, a check box 811 may be displayed to select an image forming apparatus to perform firmware update, along with a list 812 of operational status, IP address, model name, and firmware version of each image forming apparatus.

The user may select the firmware to update, based on the firmware file set menu 820.

The update information may also be input through the firmware update set menu 830. As explained above, the update information may include continuous seed information, filter information and firmware download start information. The update information may also include maximum download and/or upload speed limits.

The firmware download start information designates the time at which the image forming apparatus in receipt of the update information starts firmware downloading. Accordingly, network idle time may be utilized.

The filter information restricts a network range of the image forming apparatuses to provide the firmware blocks. As explained above with reference to FIG. 7, this restriction occurs to increase stable distribution of the firmware blocks and also increase transmission rate.

The continuous seed information is related to the continuous sender that continuously transmits firmware blocks, without performing firmware update. The continuous seed information may include continuous seeder select information and continuous seeding duration information.

The continuous seeder may be selected by a manual way in which the user directly selects one, or an automatic way in which the seeder is selected by a preset algorithm.

The automatic selection is based on the rules of Table 1 below, and user-selected items may be applied by 'AND' condition. When the continuous seeder is not selected by automatic way, the managing apparatus 100 may display an alarm message.

TABLE 1

| Item | |
|---|---|
| Select rate | Maximum rate (%) seeder apparatus among selected image forming apparatuses (integer). When calculated apparatuses are less than 1, set '1'. |
| Storage space | Size of storage of image forming apparatus |

For example, when the user selects 100 image forming apparatuses having a select rate of 5% and a storage space of 100 MB, five image forming apparatuses with 100 MB storage space may be selected. When only three image forming apparatuses meet the above conditions, the three image forming apparatuses may be selected as the continuous seeders.

Meanwhile, the continuous seeding duration information may be used to prevent the image forming apparatus as the continuous seeder from not performing update for an indefinite period of time.

The maximum speed of transmitting or receiving firmware blocks may be set based on the maximum download/upload speed limit information. The "speed" as used herein refers to data size to perform transmission per unit second. It is possible to control network traffic based on the maximum download and/or upload speed limit information.

The user may use the UI window to cause the managing apparatus 100 to receive the firmware update information. The firmware update information may be used in the firmware update procedure that takes P2P characteristics into consideration, and as a result, the firmware update management of the image forming apparatus is improved.

Figure 9:
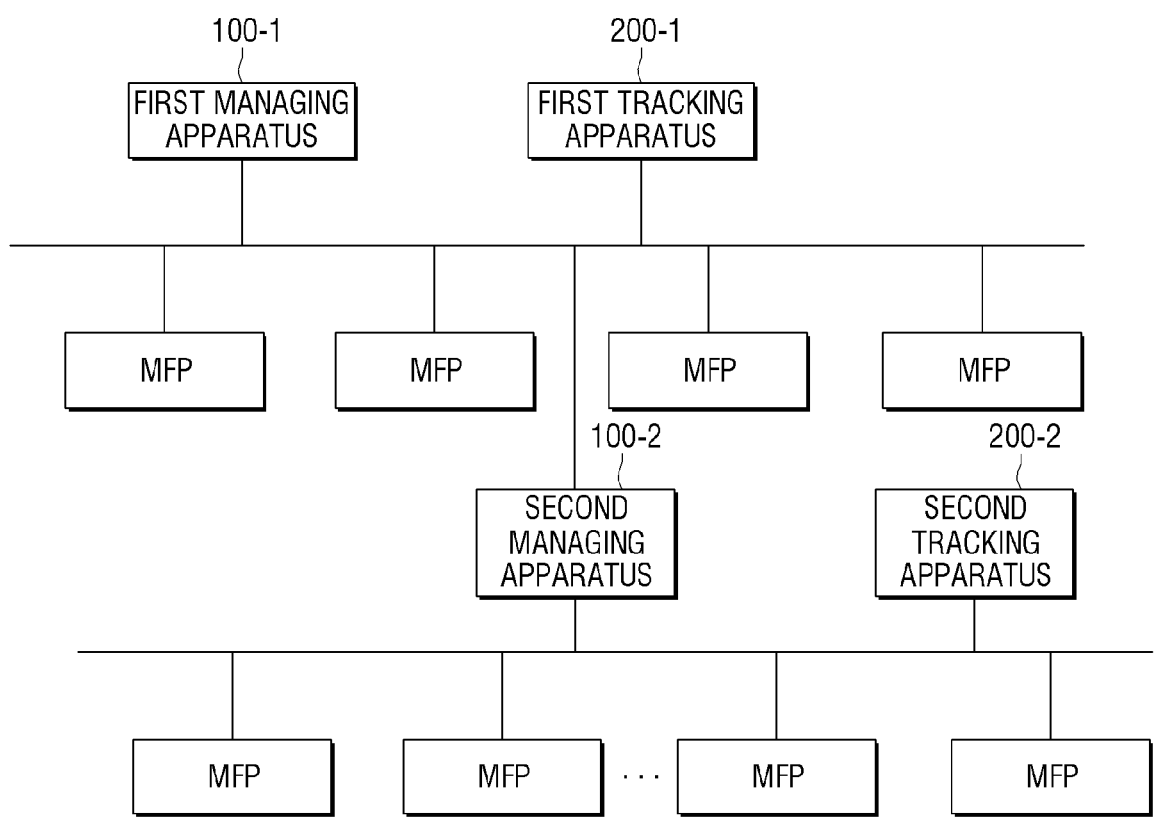
FIG. 9 is a view provided to illustrate a firmware update operation by network extension, according to various exemplary embodiments of the present general inventive concept.

FIG. 9 is a view provided to illustrate a firmware update operation via network expansion, according to various exemplary embodiments of the present general inventive concept. Particularly, the firmware update operation of a separated network will be explained in detail with reference to FIG. 9.

Referring to FIG. 9, a first network connected to a first managing apparatus 100-1 and a first tracking apparatus 200-1, and a second network connected to a second managing apparatus 100-2 and a second tracking apparatus 200-2 are separately provided.

The first managing apparatus 100-1 may check the information about the image forming apparatus on the network separated from the second managing apparatus 100-2 and set firmware update information.

The first managing apparatus 100-1 may also transmit the firmware file and update information to the second managing apparatus 100-2 so that firmware update is performed. After that, the firmware distribution and update operation are performed in the same manner as explained above with reference to FIGS. 2 through 8.

The second managing apparatus 100-2 may transmit a result to the first managing apparatus 100-1 when the firmware update is completed.

In the manner explained above, the firmware update may be performed under the management of the first managing apparatus 100-1 in an environment having a dispersed network of branches, headquarter, or overseas branch offices.

Figure 10:
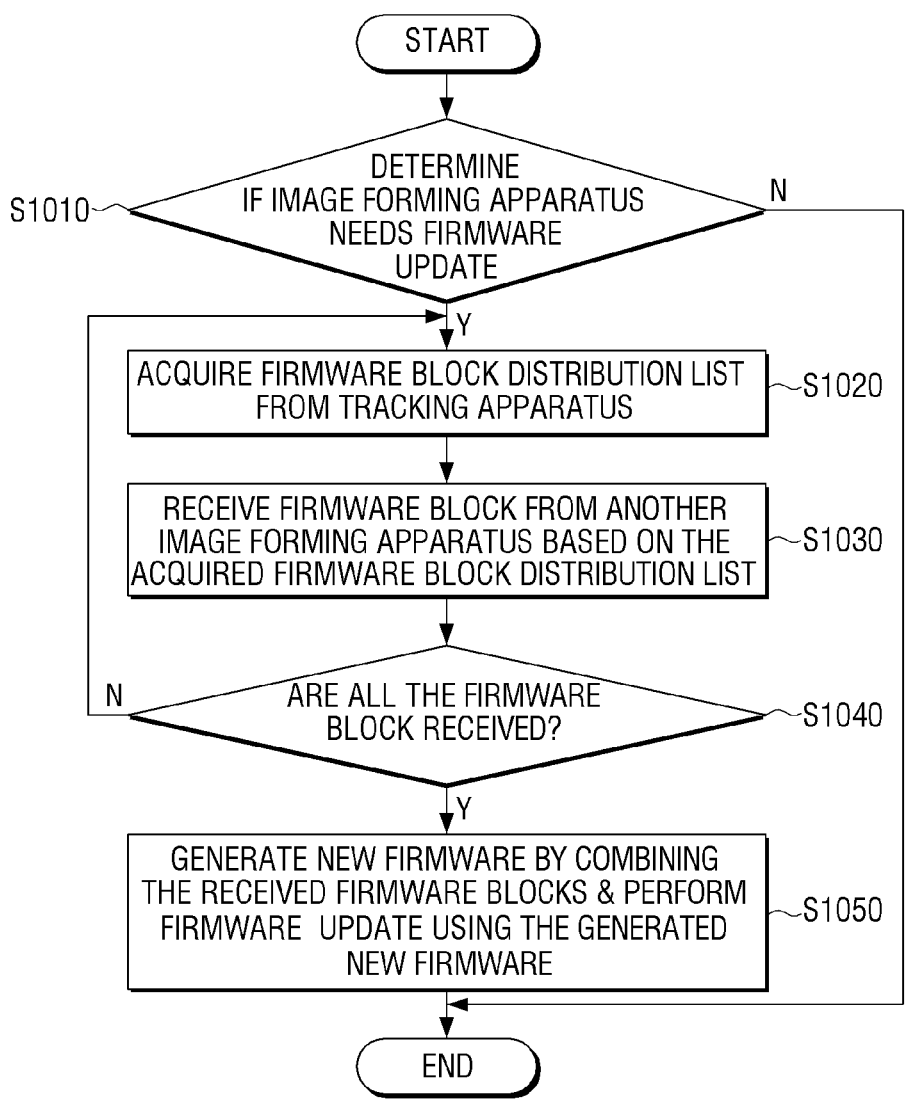
FIGS. 10 and 11 are flowcharts provided to illustrate a firmware update method of an image forming apparatus according to an exemplary embodiment of the present general inventive concept.
Figure 11:
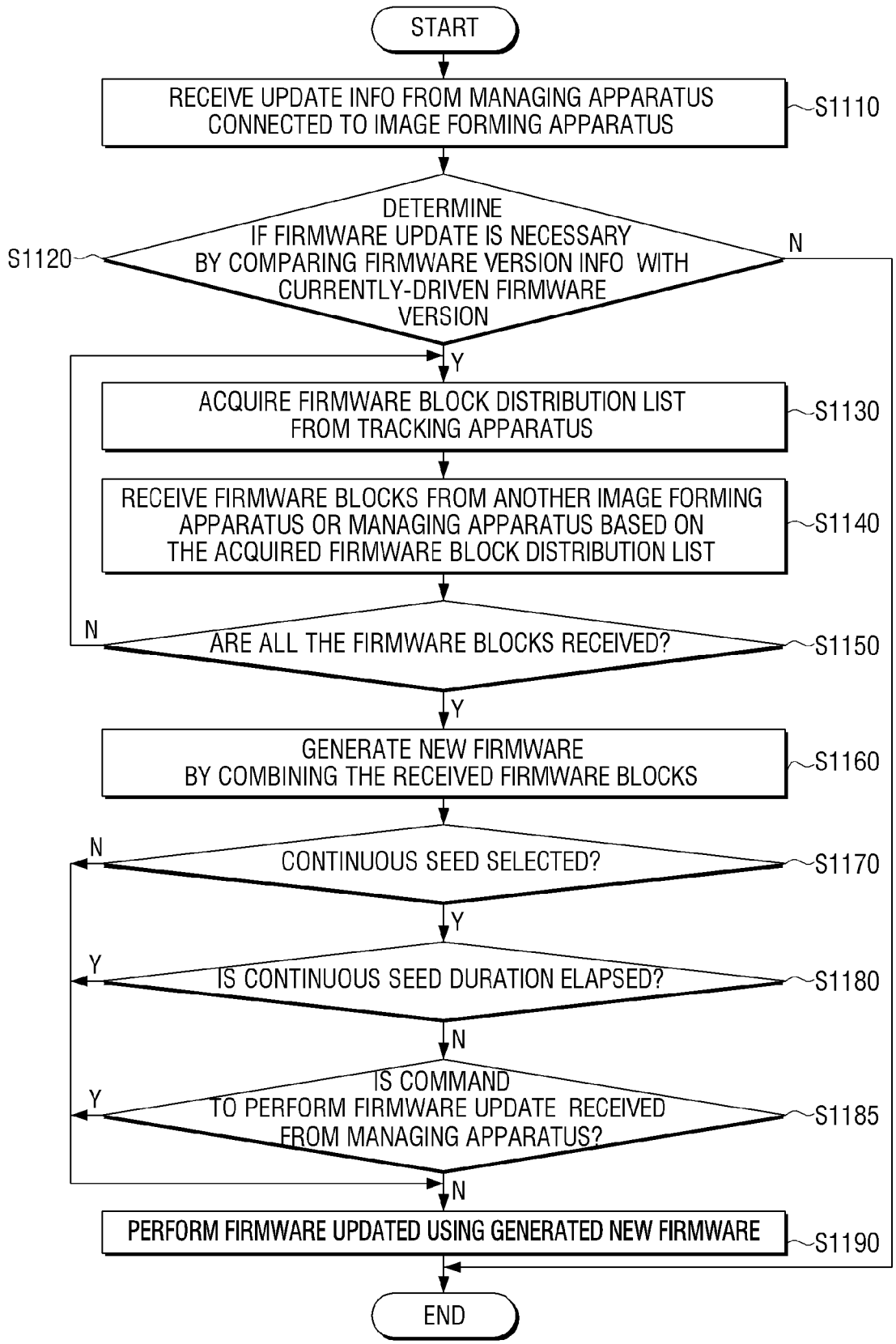

FIGS. 10 and 11 are flowchart provided to illustrate firmware update method of an image forming apparatus according to an exemplary embodiment of the present general inventive concept.

Referring to FIG. 10, at S1010, the image forming apparatus 300 determines if firmware update is necessary.

If update information is received from the managing apparatus 100 connected to the image forming apparatus, it is determined that firmware update is necessary.

The "update information," as used herein, may include, as explained above, firmware version information, firmware data information, access information of tracking apparatus 200, continuous seed information according to which firmware blocks are continuously transmitted without having firmware update, filter information that restricts network range of the image forming apparatuses to provide firmware blocks, and firmware download start information.

At S1010:Yes, when it is determined that firmware update is necessary, at S1020, the image forming apparatus 100 acquires a firmware block distributor list from the tracking apparatus 200.

To be specific, the image forming apparatus 300 may make a request from the tracking apparatus 200 to receive a firmware block distributor list, and the tracking apparatus 200 may generate and transmit the corresponding firmware block distributor list to the image forming apparatus 300.

At S1030, the image forming apparatus 300 receives firmware blocks from other image forming apparatuses based on the acquired firmware block distributor list.

Meanwhile, the image forming apparatus 300 may receive firmware blocks from the managing apparatus 100 connected to the image forming apparatus 300, as well as another one of the image forming apparatuses.

The image forming apparatus 300 may receive the firmware blocks from another image forming apparatus with the least communication traffic on the acquired firmware block distributor list or from the managing apparatus.

At S1040:Yes, when the image forming apparatus 300 receives all the firmware blocks by repeating operations S1020, S1030, at S1050, the image forming apparatus 300 generates new firmware by combining the received firmware blocks and performs the firmware update by using the generated new firmware.

The firmware update method of the image forming apparatus 300 has been explained with reference to FIG. 10. FIG. 11 is a detailed flowchart of the firmware update method of the image forming apparatus 300 of FIG. 10.

Referring to FIG. 11, when the image forming apparatus 300 receives update information from the connected managing apparatus 100, at S1110, it is determined that a firmware update is necessary, and the firmware update method is thus implemented.

The "update information," as used herein, may include, as explained above, firmware version information, firmware data information, access information of tracking apparatus 200, continuous seed information according to which firmware blocks are continuously transmitted without having firmware update, filter information that restricts network range of the image forming apparatuses 300 to provide firmware blocks, and firmware download start information.

At S1120, the image forming apparatus 300 compares the firmware version information with the version of the firmware currently installed and driven on the image forming apparatus 300 and determine if the firmware update is necessary. The image forming apparatus 300 may determine that firmware update is not necessary when the currently-driven firmware version is newer or equal, while it may determine that firmware update is necessary when the currently-driven firmware version is older.

Meanwhile, the image forming apparatus 300 may determine that firmware update is necessary when download start time elapses based on the firmware download start information.

At S1120:Yes, when the determination indicates that firmware update is necessary, at S1130, the image forming apparatus 300 may acquire the firmware block distributor list from the tracking apparatus 200.

To be specific, the image forming apparatus 300 may make a request from the tracking apparatus 200 to receive the firmware block distributor list, and the tracking apparatus 200 may generate and transmit the corresponding firmware block distributor list to the image forming apparatus 300.

At S1140, based on the acquired firmware block distributor list, the image forming apparatus 300 receives firmware blocks from other image forming apparatuses.

Meanwhile, the image forming apparatus 300 may receive firmware blocks from the managing apparatus 100 connected to the image forming apparatus, as well as other image forming apparatuses.

The image forming apparatus 300 may receive the firmware blocks from another image forming apparatus with the least communication traffic on the acquired firmware block distributor list or from the managing apparatus 100.

At S1150:Yes, when the image forming apparatus 300 receives all the firmware blocks by repeating operations S1130, S1140, at S1160, the image forming apparatus 300 may generate new firmware by combining the received firmware blocks.

Whether to perform firmware update by using the generated new firmware, may be determined as follows.

First, at S1170, it may be determined if the image forming apparatus 300 is selected to be the continuous seeder.

At S1170:No, when the image forming apparatus 300 is not selected to be the continuous seeder, the firmware update may be performed directly upon generation of new firmware.

In contrast, at S1170:Yes, when the image forming apparatus 300 is selected to be the continuous seeder, the firmware update is not performed directly. As explained above, since the image forming apparatus selected to be the continuous seeder has to continuously transmit firmware blocks to the other image forming apparatuses, the firmware update in this case may not be performed immediately.

Accordingly, at S1180: Yes, when the continuous seeding duration elapses according to the continuous seed information, or at S1185:Yes, when a command to perform firmware update is received from the managing apparatus 100, the firmware update may only be performed using the generated new firmware, at S1190.

Meanwhile, the firmware update method of the image forming apparatus as the ones illustrated in FIGS. 10 and 11, may be implemented in the image forming apparatus 300 configured as illustrated in FIG. 2, or other image forming apparatuses having different embodiments.

Figure 12:
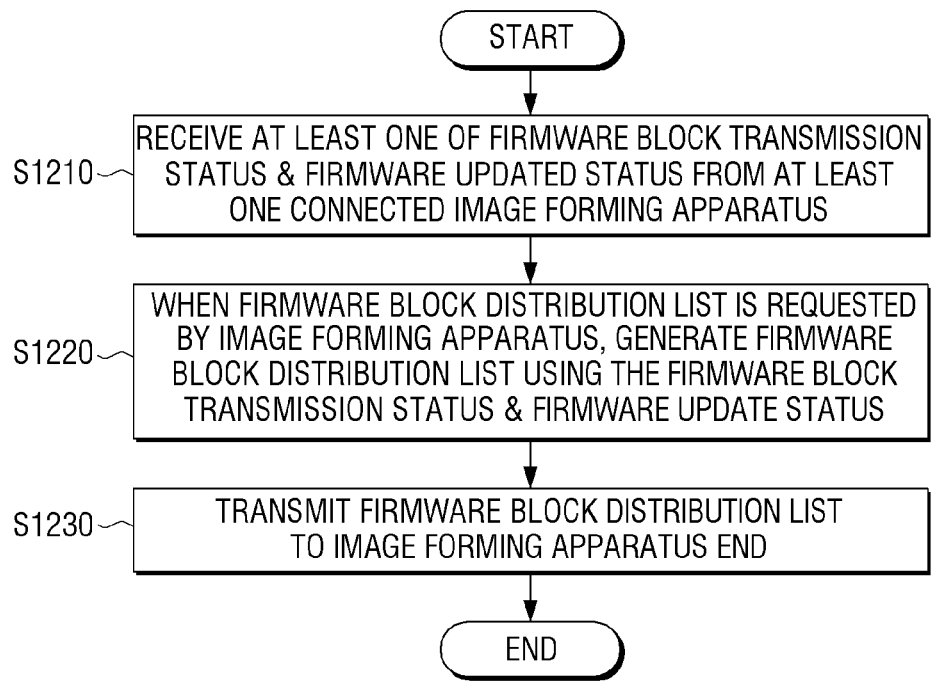
FIG. 12 is a flowchart provided to illustrate a method of updating image forming apparatus firmware of a tracking apparatus, according to an exemplary embodiment of the present general inventive concept.

FIG. 12 is a flowchart provided to illustrate a firmware update method of an image forming apparatus, by a tracking apparatus 200 according to an exemplary embodiment of the present general inventive concept.

Referring to FIG. 12, at S1210, at least one of the firmware block transmission status and the firmware update status is received from at least one image forming apparatus connected to the tracking apparatus 200.

Meanwhile, prior to S1210, the tracking apparatus 200 may receive the update information that may include at least one of firmware version information, firmware data information, access information of tracking apparatus 200, continuous seed information according to which firmware blocks are continuously transmitted without having firmware update, filter information that restricts network range of the image forming apparatuses to provide firmware blocks, and firmware download start information.

At S1220, when a request to generate a firmware block distributor list is received from the image forming apparatus 300, the tracking apparatus 200 generates the firmware block distributor list using the firmware block transmission status and the firmware update status.

To be specific, when the request to generate the firmware block distributor list, which is a list of image forming apparatuses that can transmit specific firmware blocks, is received from the image forming apparatus 300, the tracking apparatus 200 may generate a list of image forming apparatuses that can transmit corresponding firmware blocks, by considering the firmware block transmission status and the firmware update status of the connected image forming apparatus.

Meanwhile, the tracking apparatus 200 may select the image forming apparatuses to be on the firmware block distributor list, within the network range of the image forming apparatuses that can distribute firmware blocks, based on the filter information received from the managing apparatus 100. Since this is already explained above with reference to FIG. 7, redundant explanation will be omitted.

At S1230, the tracking apparatus 200 may transmit the firmware block distributor list to the image forming apparatus 300 that requested the list.

With the firmware update method of the tracking apparatus 200, as explained above with reference to FIG. 12, a specific firmware block list is provided to the image forming apparatus 300, thus enabling P2P-based firmware transmission. Further, since the firmware block list is generated using the filter information, firmware can be stably received from the image forming apparatuses that are more closely located to one another in accordance with a network.

Meanwhile, the firmware update method of the image forming apparatus, according to the embodiment as illustrated in FIG. 12, may be implemented in the tracking apparatus 200 configured as illustrated in FIG. 2, or other tracking apparatus having a different embodiment.

Figure 13:
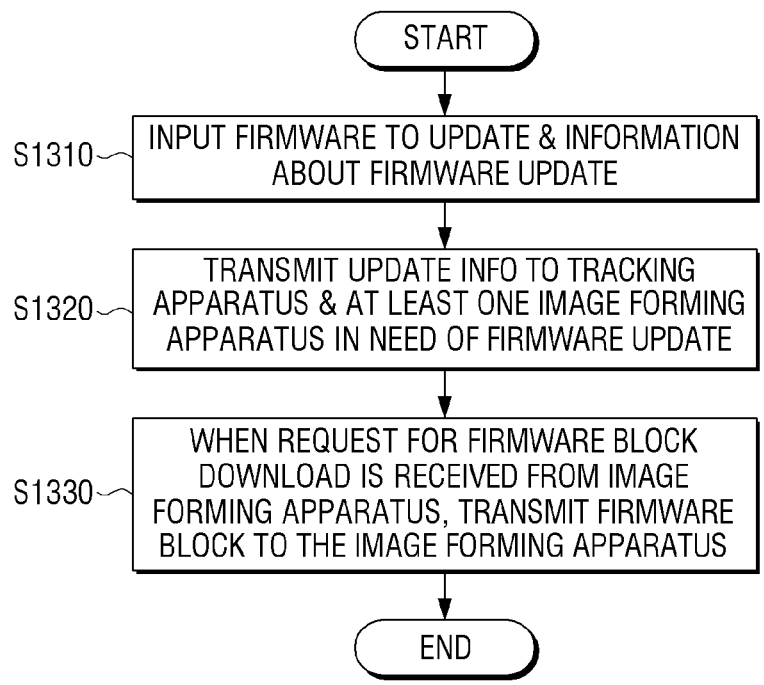
FIG. 13 is a flowchart provided to illustrate a method of updating image forming apparatus firmware of a managing apparatus, according to an exemplary embodiment of the present general inventive concept.

FIG. 13 is a flowchart provided to illustrate a firmware update method of an image forming apparatus, by a managing apparatus 100 according to an exemplary embodiment of the present general inventive concept.

Referring to FIG. 13, at S1310, when the managing apparatus 100 receives firmware to be updated and update information of the firmware, at S1320, the managing apparatus 100 transmits the update information to the tracking apparatus 200 and at least one image forming apparatus that requires a firmware update.

The "update information," as used herein, may include at least one of: firmware version information, firmware data information, access information of tracking apparatus 200, continuous seed information according to which firmware blocks are continuously transmitted without having firmware update, filter information that restricts network range of the image forming apparatuses to provide firmware blocks, and firmware download start information.

After that, at S1330, the firmware blocks are transmitted to the image forming apparatus 300 when a request to download a firmware block is received from the image forming apparatus 300.

As explained above with reference to FIG. 13, the managing apparatus 100, according to an exemplary embodiment of the present general inventive concept, may receive firmware update information from the user and control the respective image forming apparatuses and the tracking apparatus accordingly. Further, the managing apparatus 100 may play a role of an initial distributor of the firmware.

Figure 14:
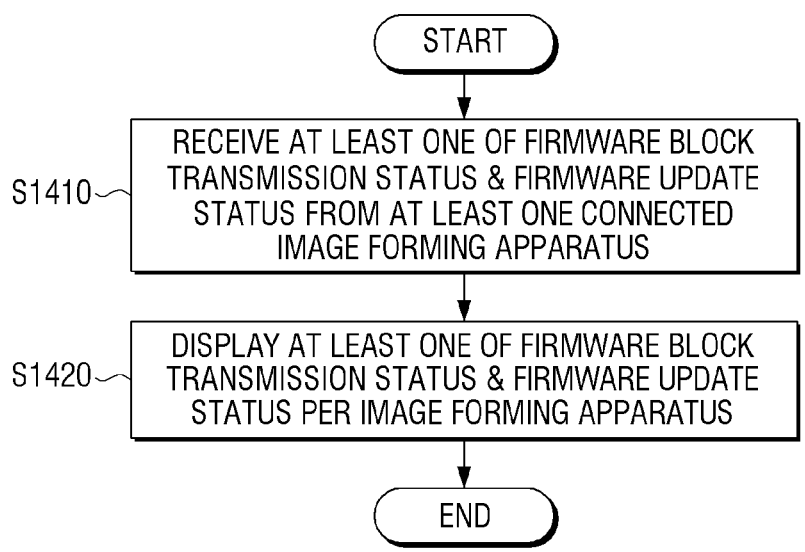
FIG. 14 is a flowchart provided to illustrate a method of updating image forming apparatus firmware of a managing apparatus, according to an exemplary embodiment of the present general inventive concept.

FIG. 14 is a flowchart provided to illustrate a firmware update method of an image forming apparatus, by a managing apparatus 100, according to various exemplary embodiments of the present general inventive concept.

Referring to FIG. 14, at least one of the firmware block transmission status and the firmware update status may be received from at least one image forming apparatus 300 connected to the managing apparatus 100.

The managing apparatus 100 may then display at least one of the received firmware block transmission status and firmware update status.

As explained above, the firmware block transmission status indicates whether the corresponding firmware blocks are transmitted and stored in the image forming apparatus, and the firmware update status indicates whether the firmware is updated in the image forming apparatus.

As explained above with reference to FIG. 14, the managing apparatus 100 according to an exemplary embodiment of the present general inventive concept may monitor a firmware update status of the respective image forming apparatuses, and depending on a particular need, may cause the image forming apparatus that has finished the transmission, to generate a command to update firmware so that the update of the firmware is performed.

Meanwhile, the firmware update method of the image forming apparatus, as illustrated in FIGS. 13 and 14, may be implemented in the managing apparatus 100 configured as illustrated in FIG. 2, or other managing apparatuses having different embodiments.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As explained above, according to various exemplary embodiments of the present general inventive concept, firmware transmission time is reduced by use of BitTorrent-based P2P transmission, and firmware update management of the image forming apparatus is improved by implementation of a firmware update procedure that takes P2P characteristics into consideration.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A firmware update method of an image forming apparatus connectable to a tracking apparatus and other image forming apparatuses, comprising:
   determining whether firmware update of the image forming apparatus is necessary;
   transmitting firmware update status to the tracking apparatus;
   acquiring a firmware block distributor list from the tracking apparatus;
   receiving firmware blocks from the other image forming apparatuses, based on the acquired firmware block distributor list; and
   generating new firmware by combining the received firmware blocks and performing firmware update using the generated, new firmware;
   wherein the firmware block distributor list is generated by selecting image forming apparatuses that have not updated firmware;
   wherein the determining comprises, when update information is received from a managing apparatus connected to the image forming apparatus, determining that firmware update is necessary;
   wherein the update information comprises firmware version information, firmware data information, access information of the tracking apparatus, continuous seed information according to which firmware blocks are continuously transmitted without having firmware update, filter information that restricts network range of the image forming apparatuses to provide firmware blocks, and firmware download start information.

2. The firmware update method of claim 1, wherein the performing the firmware update comprises, when a continuous seeder is selected based on the continuous seed information, performing firmware update after a continuous seeding duration elapses.

3. The firmware update method of claim 1, wherein the determining comprises determining whether firmware update is necessary by comparing the firmware version information with a version of currently-driven firmware.

4. The firmware update method of claim 1, wherein the performing firmware update comprises immediately performing update upon generating of the new firmware or in response to a command to perform firmware update received from a managing apparatus connected to the image forming apparatus.

5. The firmware update method of claim 1, wherein the receiving the firmware blocks comprises receiving the firmware blocks from another image forming apparatus with the least communication traffic on the acquired firmware block distributor list.

6. The firmware update method of claim 1, wherein the receiving the firmware blocks comprises receiving from the other image forming apparatuses and a managing apparatus connected to the image forming apparatus.

7. The firmware update method of claim 1, further comprising transmitting at least one of firmware block transmission status and firmware update status to at least one of a managing apparatus connected to the image forming apparatus, and the tracking apparatus.

8. A firmware update method of an image forming apparatus of a tracking apparatus which is connectable to one or more image forming apparatuses and a managing apparatus, comprising:
   receiving from the one or more connected image forming apparatuses at least one of firmware block transmission status and firmware update status;
   when a request for firmware block distributor list is received from the image forming apparatus, generating the firmware block distributor list using the firmware block transmission status and the firmware update status;
   transmitting the firmware block distributor list to the image forming apparatus; and
   receiving update information from the managing apparatus;
   wherein the firmware block distributor list is generated by selecting image forming apparatuses that have not updated firmware; and
   wherein the update information comprises firmware version information, firmware data information, access information of the tracking apparatus, continuous seed information according to which firmware blocks are continuously transmitted without having firmware update, filter information that restricts network range of the image forming apparatuses to provide firmware blocks, and firmware download start information.

9. The firmware update method of claim 8,
   wherein the generating the firmware block distributor list comprises, selecting image forming apparatuses within a network range according to the filter information, and generating the firmware block distributor list.

10. A firmware update method of an image forming apparatus of a managing apparatus which is connectable to one or more image forming apparatuses and a tracking apparatus, comprising:
    receiving update information of the firmware;
    transmitting the update information to the tracking apparatus and one or more image forming apparatuses in need of firmware update;
    receiving at least one of firmware block transmission status and firmware update status from the one or more connected image forming apparatuses;
    displaying at least one of the firmware block transmission status and the firmware update status for each image forming apparatus; and when a request for firmware block download is received from the image forming apparatus, transmitting the firmware blocks to the image forming apparatus, wherein the update information comprises firmware version information, firmware data information, access information of the tracking apparatus, continuous seed information according to which firmware blocks are continuously transmitted without having firmware update, filter information that restricts network range of the image forming apparatuses to provide firmware blocks, and firmware download start information.

11. An image forming apparatus connectable to a tracking apparatus and another image forming apparatus, the image forming apparatus comprising:
a storage;
a processor to determine whether the image forming apparatus needs firmware update, and to transmit firmware update status to the tracking apparatus; and
a communication interface to acquire a firmware block distributor list from the tracking apparatus, wherein
the processor receives firmware blocks from the another image forming apparatus and store the received blocks in the storage, based on the acquired firmware block distributor list, generates new firmware by combining the received firmware blocks, and performs firmware update using the generated, new firmware;
wherein the firmware block distributor list is generated by selecting image forming apparatuses that have not updated firmware;
wherein the processor determines that firmware update is necessary, when receiving update information from a managing apparatus connected to the image forming apparatus
wherein the update information comprises firmware version information, firmware data information, access information of the tracking apparatus, continuous seed information according to which firmware blocks are continuously transmitted without having firmware update, filter information that restricts network range of the image forming apparatuses to provide firmware blocks, and firmware download start information.

12. The image forming apparatus of claim 11, wherein the processor performs firmware update after a continuous seeding duration, when continuous seeder is selected according to the continuous seed information.

13. The image forming apparatus of claim 11, wherein the processor determines whether firmware update is necessary by comparing the firmware version information with a version of a currently-driven firmware.

14. The image forming apparatus of claim 11, wherein the processor immediately performs update upon generating of the new firmware, or performs update in response to a command to perform firmware update received from a managing apparatus connected to the image forming apparatus.

15. The image forming apparatus of claim 11, wherein the processor receives firmware blocks from an image forming apparatus with the least communication traffic on the acquired block distributor list.

16. The image forming apparatus of claim 11, wherein the processor receives the firmware blocks from the another image forming apparatus and a managing apparatus connected to the image forming apparatus.

17. The image forming apparatus of claim 11, wherein the processor transmits at least one of firmware block transmission status and firmware update status to at least one of a managing apparatus connected to the image forming apparatus and the tracking apparatus.

18. A tracking apparatus connectable to one or more image forming apparatuses and a managing apparatus, the tracking apparatus comprising:
a communication interface to receive at least one of firmware block transmission status and firmware update status from the one or more connected image forming apparatuses; and
a processor to generate a firmware block distributor list using the firmware block transmission status and the firmware update status, when receiving a request to generate the firmware block distributor list from the image forming apparatus,
wherein the processor controls the communication interface to transmit the firmware block distributor list to the image forming apparatus;
wherein the firmware block distributor list is generated by selecting image forming apparatuses that have not updated firmware; and
wherein the communication interface receives update information comprising firmware version information, firmware data information, access information of the tracking apparatus, continuous seed information according to which firmware blocks are continuously transmitted without having firmware update, filter information that restricts network range of the image forming apparatuses to provide firmware blocks, and firmware download start information.

19. The tracking apparatus of claim 18,
wherein the processor selects image forming apparatuses within a network range according to the filter information, to generate the firmware block distributor list.

20. A managing apparatus connectable to one or more image forming apparatuses and a tracking apparatus, comprising:
a user interface to receive firmware to be updated and update information of the firmware;
a communication interface to transmit the update information to the tracking apparatus and the one or more image forming apparatuses in need of firmware update; and
a processor to control the communication interface to transmit firmware blocks to the image forming apparatus, when a request to perform a firmware block download is received from the image forming apparatus,
wherein the update information comprises firmware version information, firmware data information, access information of the tracking apparatus, continuous seed information according to which firmware blocks are continuously transmitted without having firmware update, filter information that restricts network range of the image forming apparatuses to provide firmware blocks, and firmware download start information; and
wherein the processor controls the user interface to receive at least one of firmware block transmission status and firmware update status from the one or more connected image forming apparatuses and display the same with respect to each image forming apparatus.

21. A tracking apparatus, comprising:
a communication interface to connect the tracking apparatus to a managing apparatus and at least one image forming apparatus and to receive firmware update information from the managing apparatus based on a determination that a firmware update is necessary in the at least one image forming apparatus; and
a processor to generate a firmware block distributor list including any of the at least one image forming apparatuses having a same corresponding non-updated firmware block and to control the communication interface to transmit the firmware block distributor list to the at least one image forming apparatus to perform the firmware update;

wherein the firmware update information comprises firmware version information, firmware data information, access information of the tracking apparatus, continuous seed information according to which firmware blocks are continuously transmitted without having firmware update, filter information that restricts network range of the image forming apparatuses to provide firmware blocks, and firmware download start information.

22. The tracking apparatus of claim 21, wherein the determination that the firmware update is necessary in the at least one image forming apparatus is based on a receipt of at least one of a firmware block transmission status and a firmware updated status from the at least one image forming apparatus.

23. The tracking apparatus of claim 22, further comprising a storage to store the at least one of a firmware block transmission status and a firmware updated status, the update information received from the managing apparatus, and the firmware block distributor list generated by the processor.

24. The tracking apparatus of claim 21, wherein the firmware update information is sent from the managing apparatus to the tracking apparatus via a peer-to-peer method in a format of a Torrent file under a BitTorrent protocol.

* * * * *